(12) United States Patent
Choi et al.

(10) Patent No.: US 8,150,839 B2
(45) Date of Patent: Apr. 3, 2012

(54) METHOD AND SYSTEM FOR OFFERING SEARCH RESULTS

(75) Inventors: Jae Ho Choi, Kyunggi-do (KR); Kwang Hyun Kim, Kyunggi-do (KR)

(73) Assignee: NHN Corporation, Seongnam-si (KR)

( * ) Notice: Subject to any disclaimer, the term of this patent is extended or adjusted under 35 U.S.C. 154(b) by 261 days.

(21) Appl. No.: 12/485,032

(22) Filed: Jun. 15, 2009

(65) Prior Publication Data

US 2009/0254550 A1 Oct. 8, 2009

Related U.S. Application Data (63) Continuation of application No. PCT/KR2007/006880, filed on Dec. 27, 2007.

(30) Foreign Application Priority Data

Jan. 12, 2007 (KR) .................. 10-2007-0003998

(51) Int. Cl.
*G06F 7/00* (2006.01)
*G06F 17/30* (2006.01)

(52) U.S. Cl. . 707/721; 707/751; 707/768; 707/E17.109; 715/762; 715/968

(58) Field of Classification Search .................. 707/721, 707/722, 723, 748, 751, 752, 768, E17.109; 715/762, 968
See application file for complete search history.

(56) References Cited

U.S. PATENT DOCUMENTS

| | | | | |
|---|---|---|---|---|
| 6,063,030 | A * | 5/2000 | Vara et al. | 600/437 |
| 6,421,675 | B1 * | 7/2002 | Ryan et al. | 707/999.003 |
| 6,990,628 | B1 * | 1/2006 | Palmer et al. | 715/234 |
| 7,031,952 | B1 * | 4/2006 | Heumann et al. | 707/999.002 |
| 7,356,778 | B2 * | 4/2008 | Hooper et al. | 715/841 |
| 7,552,395 | B2 * | 6/2009 | Neale et al. | 715/763 |
| 7,571,155 | B2 * | 8/2009 | Choi et al. | 707/999.003 |
| 7,818,319 | B2 * | 10/2010 | Henkin et al. | 707/726 |

(Continued)

FOREIGN PATENT DOCUMENTS

KR 10-2004-0074693 8/2004

(Continued)

OTHER PUBLICATIONS

Bamshad Mobasher & Sarabjot Singh Anand—"Intelligent Techniques for Web Personalization"—Proceedings the third international workshop (ITWP 2005), Aug. 1, 2005 (pp. 1-87)—The 19th IJCAI' 2005, Edingburgh, Scotland, UK.*

(Continued)

*Primary Examiner* — John E Breene
*Assistant Examiner* — Anh Ly
(74) *Attorney, Agent, or Firm* — H.C. Park & Associates, PLC (57) ABSTRACT

A method of providing a search result and a system for executing the method are provided. A method of providing a search result includes: setting a grade of a category associated with a keyword based on click information; creating a category list to maintain the category list in association with the keyword, wherein the category list includes the category that is arranged according to the grade; and providing a search result for the keyword in an order of the category in the category list, wherein the click information includes information regarding whether the category is clicked on and a clicked order.

19 Claims, 8 Drawing Sheets

U.S. PATENT DOCUMENTS

| | | | |
|---|---|---|---|
| 2002/0169760 A1* | 11/2002 | Cheung et al. | 707/3 |
| 2003/0028529 A1* | 2/2003 | Cheung et al. | 707/3 |
| 2005/0004711 A1* | 1/2005 | Hirose | 700/265 |
| 2005/0033632 A1* | 2/2005 | Wu et al. | 705/10 |
| 2005/0038894 A1* | 2/2005 | Hsu et al. | 709/228 |
| 2005/0065928 A1* | 3/2005 | Mortensen et al. | 707/5 |
| 2005/0149390 A1* | 7/2005 | Scholl et al. | 705/14 |
| 2006/0004711 A1 | 1/2006 | Naam | |
| 2006/0020516 A1* | 1/2006 | Choi et al. | 705/26 |
| 2006/0161534 A1* | 7/2006 | Carson et al. | 707/3 |
| 2006/0268007 A1* | 11/2006 | Gopalakrishnan | 345/619 |
| 2007/0002077 A1* | 1/2007 | Gopalakrishnan | 345/619 |
| 2007/0106721 A1* | 5/2007 | Schloter | 709/200 |
| 2007/0136753 A1* | 6/2007 | Bovenschulte et al. | 725/46 |
| 2007/0208730 A1* | 9/2007 | Agichtein et al. | 707/5 |
| 2007/0276800 A1* | 11/2007 | Lee | 707/3 |
| 2008/0027812 A1* | 1/2008 | Hsu et al. | 705/14 |
| 2008/0059310 A1* | 3/2008 | Lettow et al. | 705/14 |
| 2008/0288456 A1* | 11/2008 | Omoigui | 707/3 |
| 2009/0171984 A1* | 7/2009 | Park et al. | 707/100 |
| 2009/0254550 A1* | 10/2009 | Choi et al. | 707/5 |

FOREIGN PATENT DOCUMENTS

| | | |
|---|---|---|
| KR | 10-2004-0079604 | 9/2004 |
| KR | 10-0452085 | 9/2004 |
| KR | 10-0492075 | 5/2005 |

OTHER PUBLICATIONS

Naaman et al. "Context Date in Geo-Referenced Digital Photo Collections" Multimedia '04: Proceddings of the 12$^{th}$ annual ACM International Conference on Multimedia, Oct. 10-16, 2004 (pp. 196-203:1-8).*

Zhao et al.—"Event Dectection from Evolution of Click-through Data"—KDD'06 Aug. 20-23, 2006, Philadephiia, Pennsylvania, USA (proceedings of the 12$^{th}$ ACMSIGKDD International conference on Knowledge Discovery and Data Mining (pp. 484-493:1-10).*

* cited by examiner

FIG. 1

- PRIOR ART -

FIG. 2

- PRIOR ART -

210

| CATEGORY | A | B | C | NUMBER OF CLICKS | ARRANGEMENT OF NUMBER OF TIMES | CATEGORY |
|---|---|---|---|---|---|---|
| KIN | √ |  | √ | 2.00 | 3.00 | BLG |
| BLG | √ | √ | √ | 3.00 | 3.00 | DOC |
| CAF | √ |  |  | 1.00 | 2.00 | KIN |
| DIR |  |  |  | 0.00 | 1.00 | CAF |
| DOC | √ | √ | √ | 3.00 | 0.00 | DIR |
| BOK |  |  |  | 0.00 | 0.00 | BOK |

211, 212, 213, 214, 215

220

BASED ON NUMBER OF CLICKS 221, 222

METHOD AND SYSTEM FOR OFFERING SEARCH RESULTS

CROSS-REFERENCE TO RELATED APPLICATION

This application is a continuation of prior International Application PCT Application No. PCT/KR2007/006880 filed on Dec. 27, 2007, which claims the benefit of priority from Korean Patent Application No. 10-2007-0003998 filed on Jan. 12, 2007. The disclosures of International Application PCT Application No. PCT/KR2007/006880 and Korean Patent Application No. 10-2007-0003998 are incorporated herein by reference.

BACKGROUND OF THE INVENTION

The present invention relates to a method of providing search results and a system for executing the method, and more particularly, to a method and system that with respect to grades of categories included in a search result list provided according to a keyword, can classify grades of unclicked categories and grades of clicked categories with the same number of clicks based on the number of clicks and user feedback information and thereby can create and provide a search result consistent with the user intent.

Figure 1:
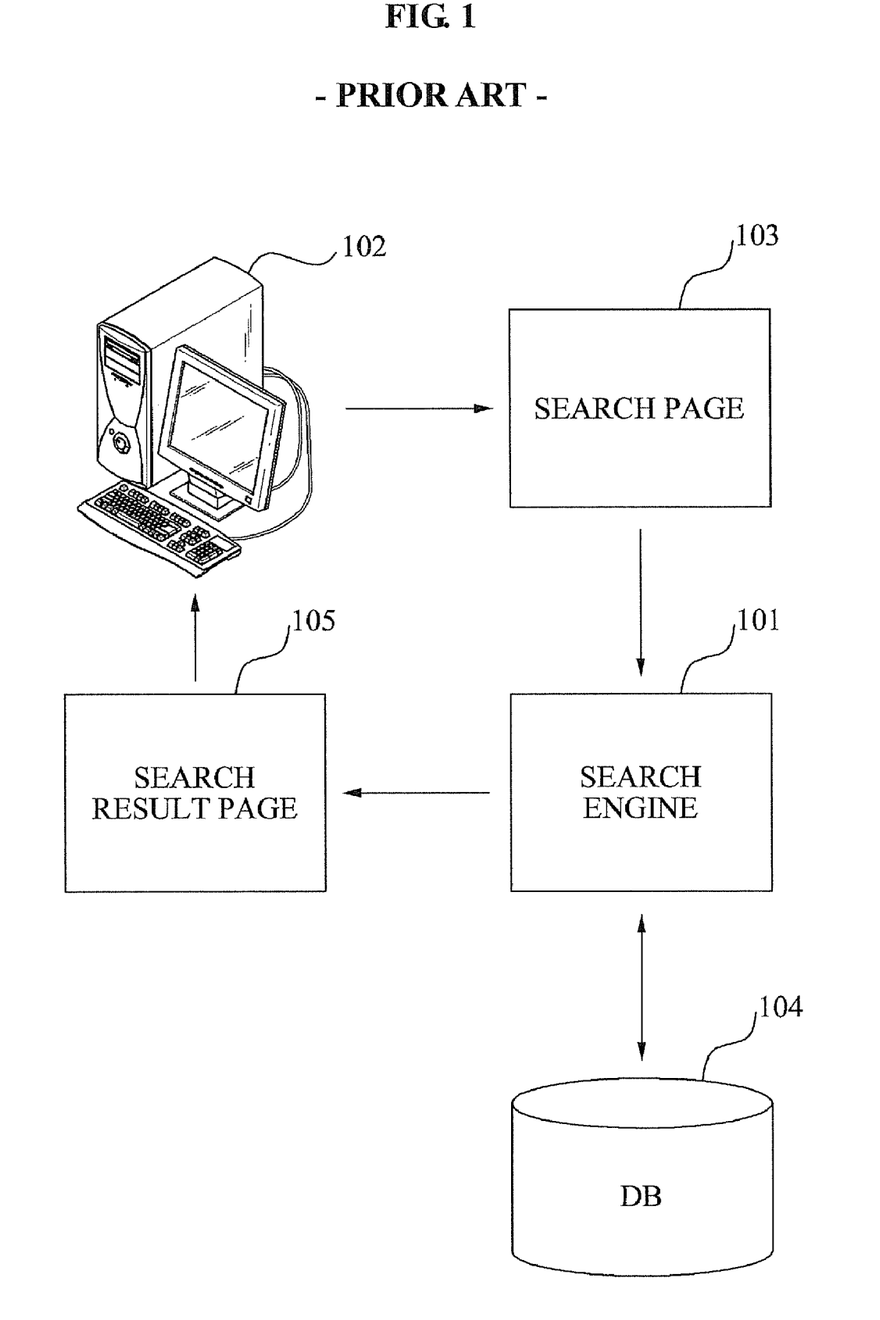
FIG. 1 illustrates a schematic diagram of performing searching through a search engine according to the prior art.

A search engine denotes software or a website that helps a user to readily retrieve materials from the Internet. The search engine searches a database using a keyword entered from a user, extracts a search result from the database, and provides the search result for the user. FIG. 1 illustrates a schematic diagram of performing searching through a search engine 101 according to a conventional art.

The search engine 101 extracts a search result from a database 104, creates a search result page 105, and transmits the search result page 105 to a user terminal 102. The search result includes a keyword transmitted from the user terminal 102 via a search page 103.

The search engine 101 extracts from the database 104 the search result that includes the keyword depending on a matching degree between the keyword and the search result. The search engine 101 constructs the search result page 105. Specifically, a search result with a higher matching degree may rank in a higher place in the search result page 105.

However, when a large number of search results are retrieved in association with the keyword, a method of sequentially displaying the search results may deteriorate the visibility of the search result page 105. The user should check the search result of the search result page 105 completely in order to find the user's desired search result.

In order to solve the above problems, the conventional art includes a method of performing searching according to a search request when the search request is received from a user, arranging a search request in a categorical order, and providing the user with the search result. Examples of the category may include cafes, blogs, documents, books, news, and images. In order to determine the categorical order, there is a method of arranging categories by using a number of clicks as user feedback information.

Figure 2:
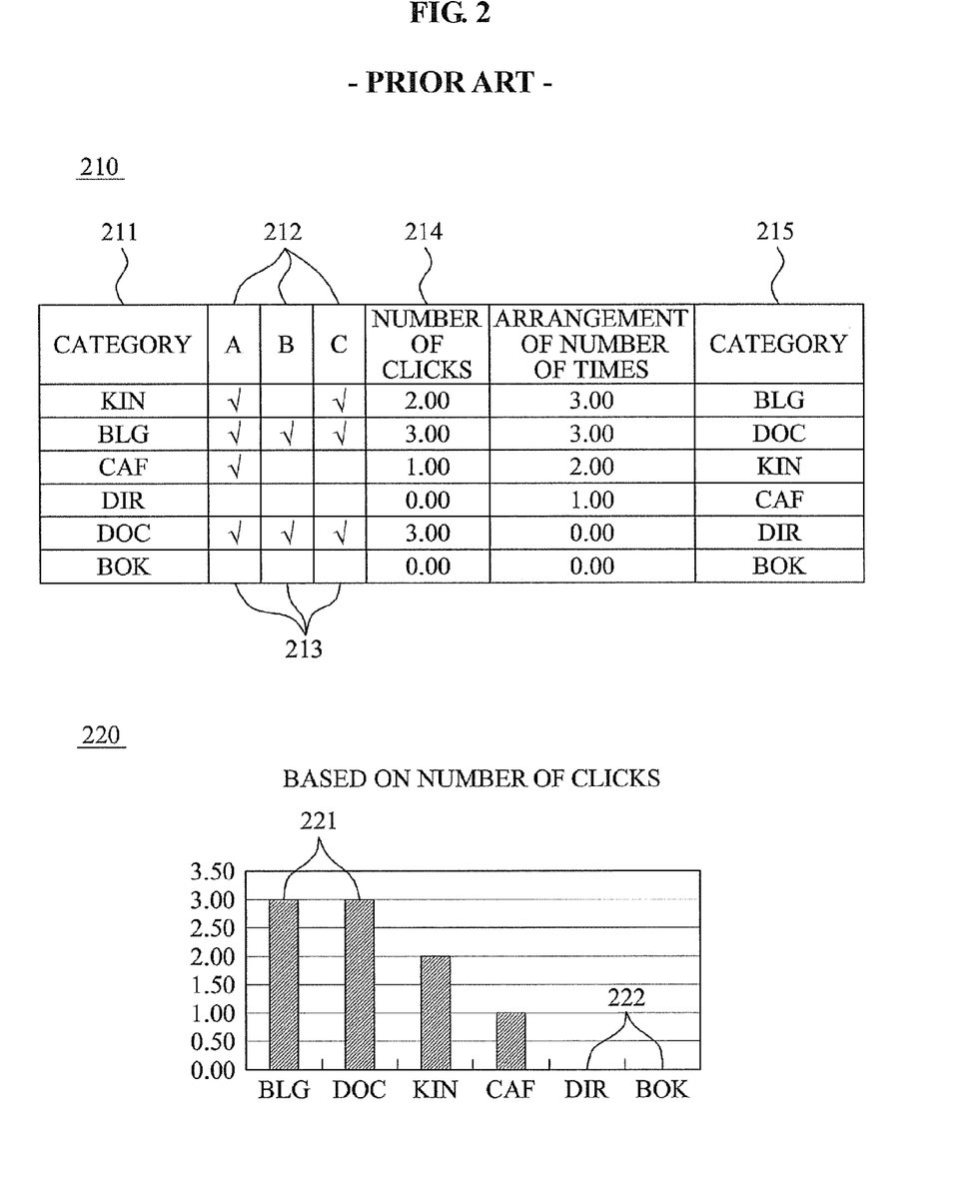
FIG. 2 illustrates an example of arranging categories based on a number of clicks according to the prior art.

FIG. 2 illustrates an example of arranging categories using a number of clicks according to the conventional art. Referring to a table 210, columns 213 show whether users included in fields 212 click on a plurality of categories shown in a field 212. Also, a field 214 shows a number of clicks for each category and a field 215 shows categories that are arranged according to the number of clicks. Specifically, it is possible to reflect the user intent by arranging the categories based on the number of clicks in association with a keyword.

However, as shown in bars 221 and 222 of a graph 220 based on the number of clicks for each category in the table 210, it may be difficult to know an arrangement criterion between categories with the same number of clicks and between unclicked categories.

Specifically, when arranging categories, it is impossible to accurately reflect the user intent. Also, it is difficult to verify the arrangement order when the number of clicks is the same or when categories are not clicked.

SUMMARY OF THE INVENTION

An aspect of the present invention provides a method of providing customized search results which arrange a plurality of categorical search listings in a user-preferred order. The present invention can set a grade of each of a plurality of categories, provided as search results associated with a keyword, based on a number of clicks for each category and a clicked order between the plurality of categories in previous search results, and provide new search results for the keyword based on the grade and thereby can provide the search results arranged in a user-preferred order.

Another aspect of the present invention also provides a method and system that can classify unclicked categories into a category skipped by a user and a category of which a click is reserved by the user in previous search results, and set a grade of the category and thereby can determine a display order in a user-preferred order among the unclicked categories.

Another aspect of the present invention also provides a method and system that can use grouping and the mean for determining a grade and thereby reduce the negative effect that may occur when using user feedback information.

According to an aspect of the present invention, there is provided a method of providing a search result, including: determining grades of categories associated with a search keyword based on click information and creating and maintaining a category list in association with said search keyword, said category list including a plurality of categories arranged according to said grades. Upon receipt of a search request including said search keyword, the present invention provides search results, said search results including said plurality of categories arranged according to said category list. The click information includes at least one of historical click through data about which categories were clicked on in a previous search and an order of clicks on clicked categories In an aspect of the present invention, the setting may include: providing a search result page about the category as the search result for the keyword entered from a user terminal; and setting the grade of the category based on whether the category included in the search result page is clicked on and the clicked order.

Also, the setting of the grade of the category based on whether the category included in the search result page is clicked on and the clicked order may include: verifying whether the category is clicked on, and setting a grade of the clicked category; setting a grade of a reserved category that is a category after a the lowest positioned category in the search result page among the clicked categories; and setting a grade of a skipped category that is a remaining category after excluding the clicked category and the reserved category.

Also, the search result page may be constructed based on a default category list where the category is arranged according to a number of clicks on the category. The clicks occur in association with the keyword. The verifying and the setting of the grade of the clicked category may verify the clicked category in an order of the default category list to set the grade of the clicked category, and set consecutively clicked categories as the same grade.

Also, the setting of the grade of the reserved category may include: verifying the reserved category and a number of reserved categories based on the lowest positioned category in the search result page among the clicked categories; and computing a grade of the reserved category based on the number of clicked categories and the number of reserved categories. The setting of the grade of the skipped category may include: identifying a number of skipped categories from a total of categories, wherein the skipped category is a remaining category after excluding the number of clicked categories and the number of reserved categories; and computing the grade of the skipped category based on the number of clicked categories, the number of reserved categories, and the number of skipped categories.

According to another aspect of the present invention, there is provided a system for providing a search result, including: a grade setting module configured to determine grades of categories associated with a search keyword based on click information; and a category list maintaining module configured to create and maintain a category list in association with said search keyword, said category list including a plurality of categories arranged according to said grades. A search result providing module of the present invention provides a search result for the keyword in an order of the category in the category list, wherein the click information includes information regarding whether the category is clicked on and a clicked order.

DETAILED DESCRIPTION OF THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 3:
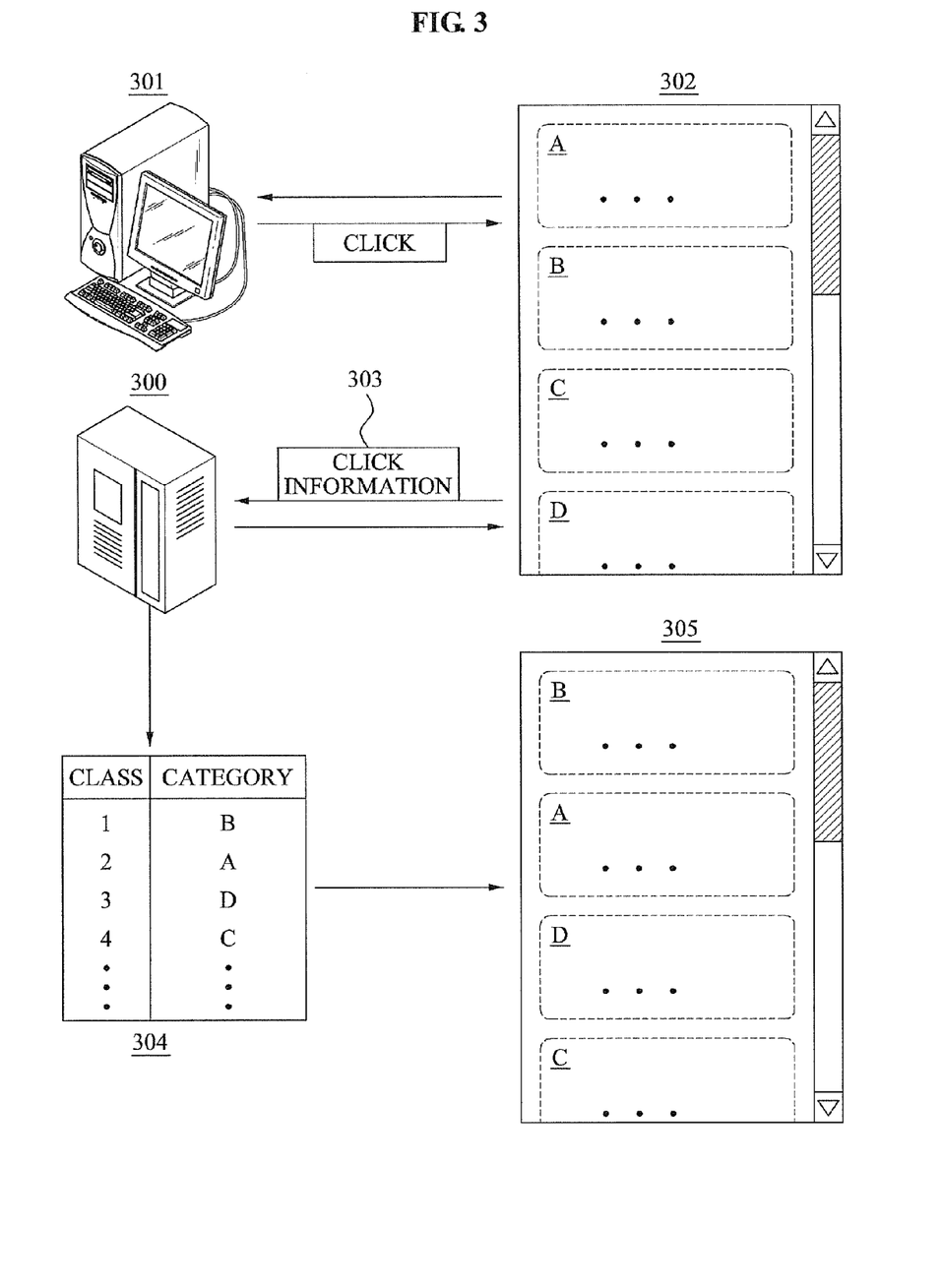
FIG. 3 illustrates an example of providing a search result according to an embodiment of the present invention.

FIG. 3 illustrates an example of providing a search result according to an embodiment of the present invention.

A search result providing system 300 arranges a search result page 302 corresponding to a search keyword entered from a user terminal 301, and provides the search result page 302 to the user terminal 301. The search result page 302 may be provided by arranging search results using a plurality of categories. For example, the search result providing system 300 arranges a plurality of categories based on a click through data, that is the number of clicks on search listings included in each category, and thereby creates and provides the search result page 302 for the keyword. The system 300 monitors clicks in previous search results, counts the number of clicks on each category and records historical click through data.

The search result providing system 300 may verify click information 303 about clicks from the user terminal 301 on a search result page 302 in the previous search results. A search result page 302 generally displays a plurality of categories which are positioned from the top to the bottom of the search result page 302. For example, the categories A, B, C and D can be positioned from the top to the bottom of the search result page 302 in an alphabetical order. In one embodiment, the click information 303 includes historical click through data about which categories were clicked on in a previous search and the order of the clicks among those clicked categories. The search result providing system 300 may have different grade computing schemes with respect to a clicked category and an unclicked category. The search result providing system 300 may classify the plurality of unclicked categories into a reserved category and a skipped category based on the click through data.

In one embodiment, the search result providing system 300 sets a grade for each category based on the click information 303. The search result providing system 300 creates a category list 304 where the categories are arranged according to their grades, and stores the created category list 304 in association with the keyword. Through this, when the search result providing system 300 receives the keyword, the search result providing system 300 retrieves the category list 304 associated with the keyword, constructs the search result page 305 based on the retrieved category list 304, and provides the search result page 305 to the user terminal 301 that transmitted the keyword.

Hereinafter, a method of providing a search result will be described in detail with reference to FIGS. 4 through 7.

Figure 4:
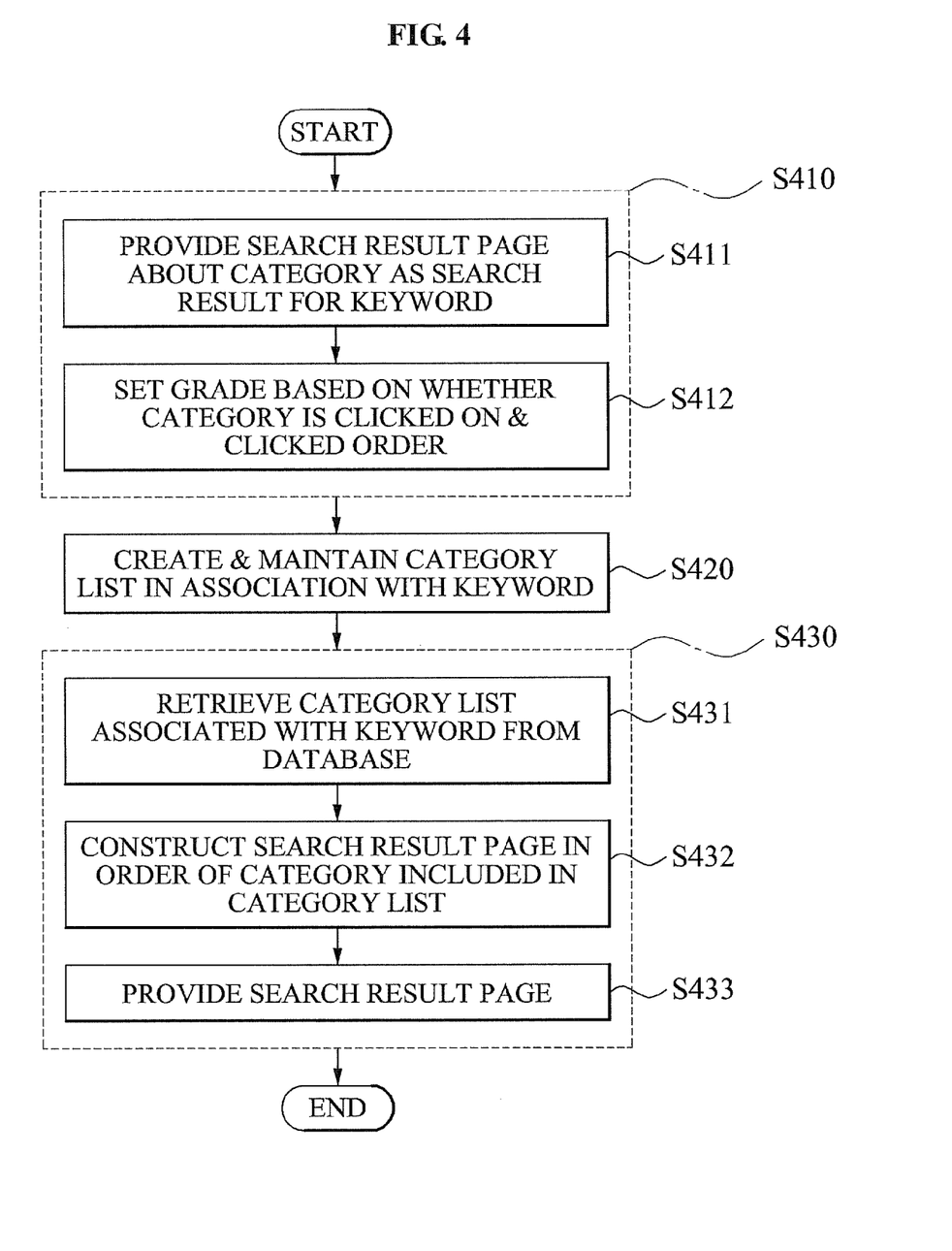
FIG. 4 is a flowchart illustrating a method of providing a search result according to an embodiment of the present invention.

In operation S410, a search result providing system sets a grade of a category associated with a keyword based on click information. The click information may include historical click through data such as information regarding which category was clicked and an order of the clicks among the displayed categories. Also, as shown in FIG. 4, in order to set the grade based on the click information, the search result providing system may perform operations S411 and S412 included in operation S410.

In operation S411, the search result providing system provides a search result page including a plurality of categories which includes categorical search listings in response to a search request including a search keyword received from a user terminal. The search result page may be constructed based on a category list in which the categories are arranged according to the number of clicks on the respective categories. The historical click through data are collected in association with search keywords. Specifically, in order to obtain click information about categories associated with the keyword entered from the user terminal, the search result providing system may construct the search result page in the order of the category list and provide the search result page for the user terminal. In the category list, the categories are arranged according to the number of clicks on each category.

In operation S412, the search result providing system sets the grade of the category based on whether search listings included in each category of the search result page have been clicked on and an order of the clicks. The search result providing system may verify a clicked category based on whether the category is clicked on, and may also verify a reserved category and a skipped category based on the clicked order. A method of setting the grade of the category will be further described in detail with reference to FIG. 5.

In operation S420, the search result providing system creates a category list and maintains the category list in association with a search keyword. The category list includes categories that are arranged according to their grades. In one embodiment, the search result providing system creates a category list by rearranging categories of a default category list according to their grades and stores the category list in a database in association with the search keyword. As described above, the category of the default category list is arranged according to the number of clicks on the category.

Specifically, when the grade of the category is set, the search result providing system creates a category list by rearranging the categories of the default category list according to their grades and stores the category list in the database in association with the search keyword. Accordingly, when providing the search result for the keyword, it is possible to retrieve the category list associated with the keyword from the database.

In operation S430, the search result providing system provides search results for the search keyword in an order of the categories in the category list. Specifically, the search result providing system arranges the category in the order of the categories that are arranged according to their grades, and thereby provides the search results in a user preferred order. For this, as shown in FIG. 4, the search result providing system may perform operations S431 through S433 included in operation S430.

In operation S431, when the keyword is entered from a user terminal, the search result providing system retrieves a category list associated with the keyword from the database.

In operation S432, the search result providing system constructs a search result page in an order of the categories that are included in the retrieved category list. Specifically, the search result for the keyword may arrange categories in the order of each of categories included in the category list.

In operation S433, the search result providing system provides a search result list for the user terminal as the search result. As described above, with respect to the grades of the plurality of categories provided as the search result for the keyword, instead of using only the number of clicks for each category, the grade of each category is set based on the number of clicks and the order of such clicks among the categories. The search result for the keyword is provided based on the grade. Accordingly, it is possible to provide the search result with the user intent reflected.

Figure 5:
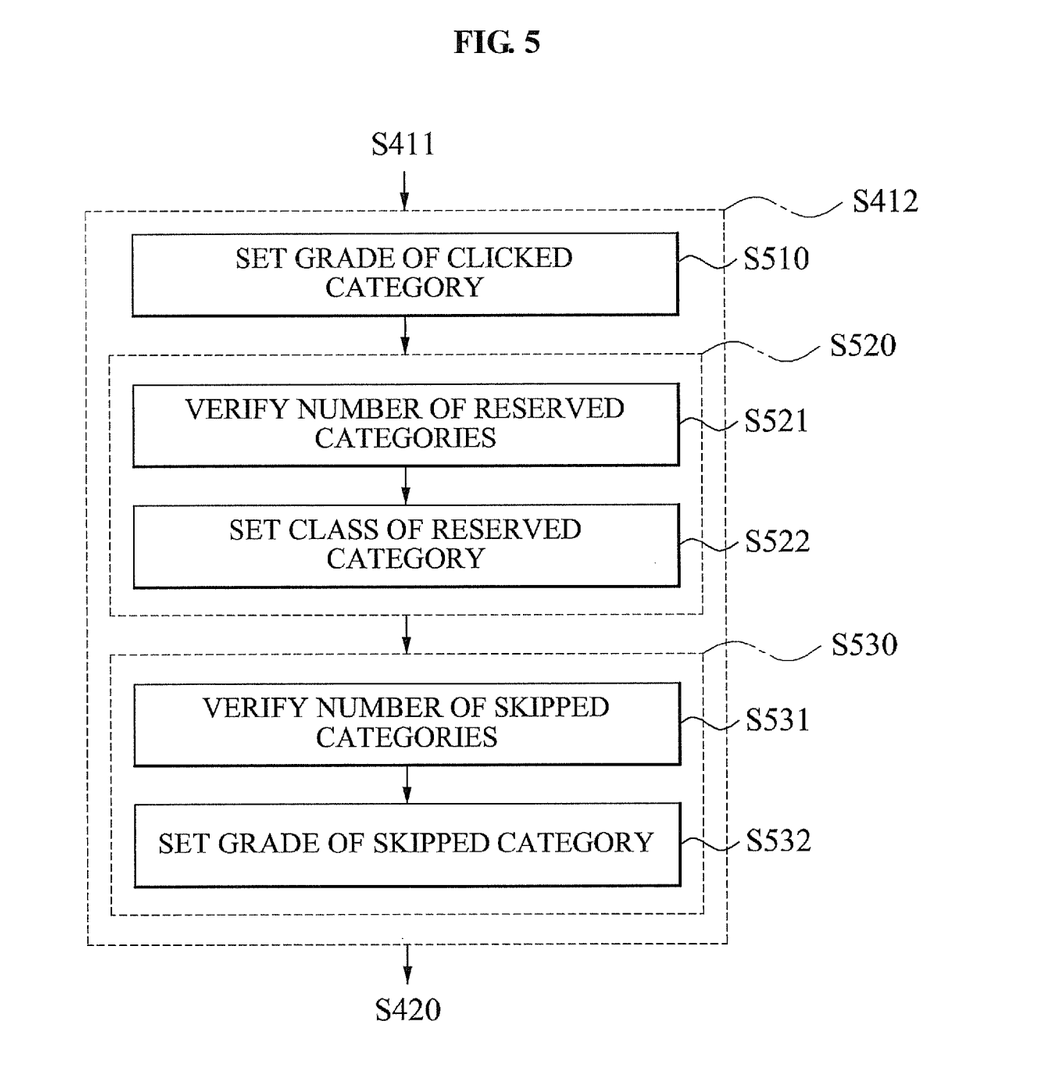
FIG. 5 is a flowchart illustrating a method of setting a grade of a category according to an embodiment of the present invention.

FIG. 5 is a flowchart illustrating a method of setting a grade of a category according to an embodiment of the present invention. As show in FIG. 5, operations S510 through S530 may be included in operation S412 of FIG. 4 and be performed.

In operation S510, the search result providing system verifies whether the category is clicked on, and sets a grade of the clicked category. The search result page may be constructed based on a default category list where the categories are arranged according to the number of clicks on each category in one or more previous search results. The clicks occur in association with the keyword. The categories are positioned in top-down order on a search result page. In operation S510, the search result providing system monitors one or more users' interaction with each category included in one or more previous search results and verifies the clicked category in each search result and the order of such clicks in said search result. In one embodiment, the search result providing system can give a same grade to consecutively clicked categories which are also positioned adjacent each other.

For example, among clicked categories, a first clicked category (i.e. first category) may be set to grade "1" in the category list and a subsequently clicked category, that is, a second category may be set to grade "2". However, when the first category and the second category are positioned adjacent each other in the search result page and consecutively clicked, both the first category and the second category can be set to grade "1".

In operation S520, the search result providing system sets a grade of a reserved category. The reserved category is positioned below the lowest positioned category in the search result page among the clicked categories. Specifically, the reserved category may be set to a grade lower than any of the clicked categories. For this, operation S520 may include operations S521 and S522.

In operation S521, the search result providing system verifies the reserved category and a number of reserved categories below the lowest positioned category in the search result page among the clicked categories. For example, when the default category list includes a total of seven categories and a fifth category is the lowest positioned category in the search result page among the clicked categories, the number of reserved categories is two, and thus have a value of "2".

In operation S522, in one embodiment, the search result providing system calculates a grade of one or more reserved categories based on the number of clicked categories and the number of reserved categories. In operation S522, the search result providing system may compute the grade of the reserved category according to, $$\text{grade of reserved category} = (2k+n-1)/2 \qquad [\text{Equation 1}]$$

where k denotes (the number of clicked categories+1), n denotes the number of reserved categories, and Equation 5 denotes the mean of an arithmetic sequence when the number of reserved categories is the arithmetic sequence with a common difference of 1.

In operation S530, the search result providing system sets a grade of one or more skipped categories that are remaining categories after excluding the clicked categories and the reserved categories. The skipped category may be a category that is viewed but not clicked by the user. Specifically, the skipped category may be a category that is skipped by the user.

In operation S531, the search result providing system identifies the number of skipped categories from a total of categories. The skipped categories are remaining categories after excluding the number of clicked categories and the number of reserved categories. The skipped categories are unclicked categories positioned above said lowest positioned clicked category. For example, when the default category list includes a total of seven categories, three out of them are clicked, and a fifth category is the lowest positioned category in the search result page among the clicked categories, the number of skipped categories may be two and have a value of "2".

In operation S532, the search result providing system computes the grade of the skipped category based on the number of clicked categories, the number of reserved categories, and the number of skipped categories. In operation S532, the search result providing system may compute the grade of the skipped category according to, $$\text{grade of skipped category} = (2k+n-1)/2 \qquad [\text{Equation 2}]$$

where k denotes (the number of clicked categories+the number of reserved categories+1), n denotes the number of skipped categories, and Equation 2 denotes the mean of an arithmetic sequence when the number of skipped categories is the arithmetic sequence with a common difference of 1.

Specifically, it is possible to set grades of all the categories associated with the keyword by setting the grade of the clicked category, the grade of the reserved category, and the grade of the skipped category. Hereinafter, a method of setting a grade of a category will be further described in detail with reference to FIG. 6.

Figure 6:
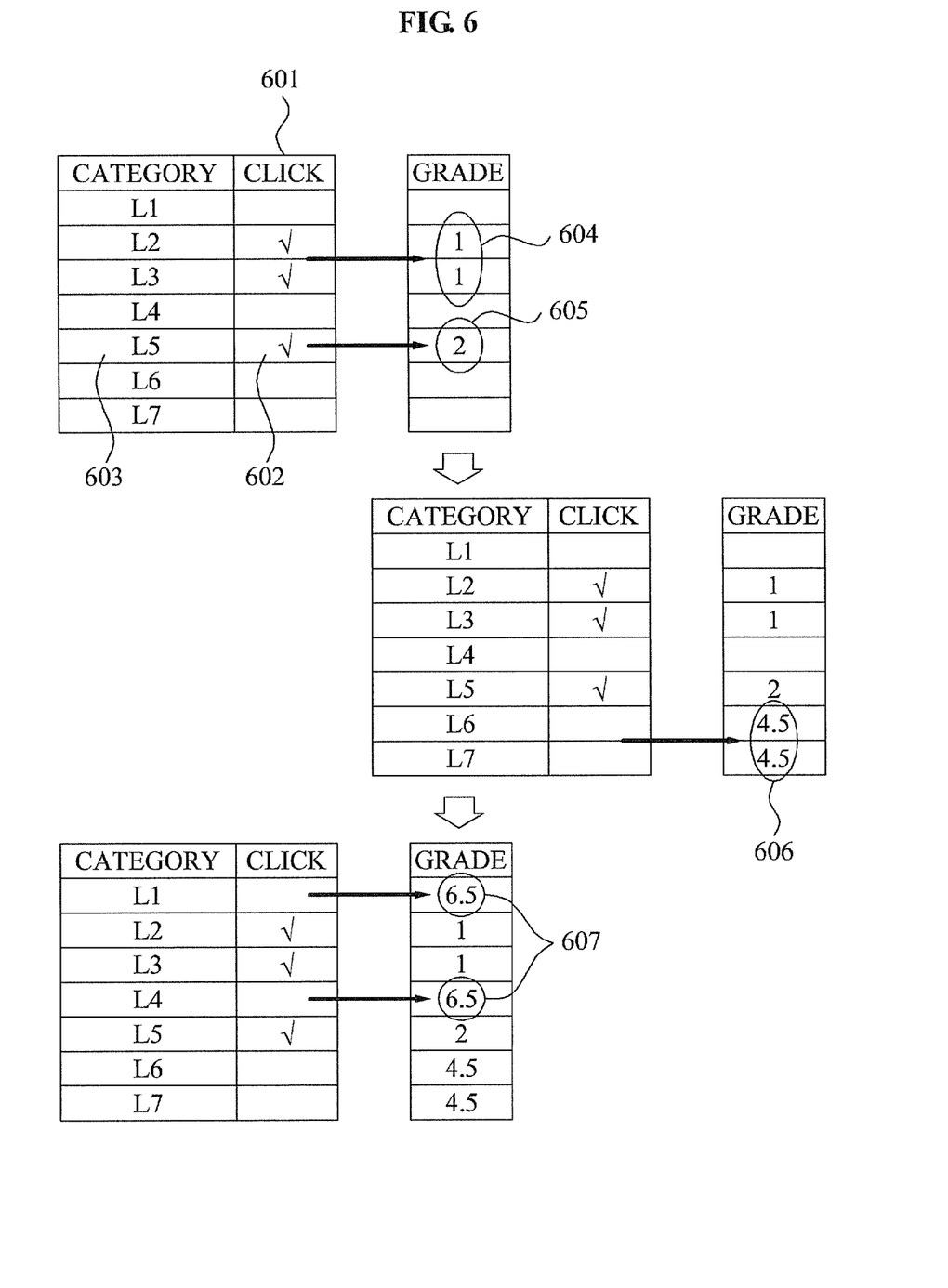
FIG. 6 illustrates an example of setting a grade of a category according to an embodiment of the present invention.

FIG. 6 is an example of explaining a method of setting a grade of a category according to an embodiment of the present invention. As described above, the grade of the category may be set by computing the grade of the clicked category, the grade of the reserved category, and the grade of the skipped category.

The clicked category may denote a category that was clicked by a user in a click field 601. The reserved category may denote a category positioned below the lowest positioned category L5 603 in the search result page among the clicked categories as shown in a cell 602. The skipped category may denote a remaining category after excluding the clicked category and the reserved category. Specifically, the skipped category may be a category that is verified but not clicked by a user of the user terminal, i.e. a category that is skipped by the user. The skipped categories are unclicked categories positioned above said lowest positioned clicked category. The reserved category may be a category that can be verified only through scrolling in the search result page, or may be a category that is not verified by the user after the user obtains a desired result associated with the keyword.

The grade of the clicked category may be set according to an existing display order with respect to categories clicked by the user terminal. Referring to FIG. 6, when categories L1, *L2, *L3, L4, *L5, L6, and L7 exist and the symbol "*" denotes that a corresponding category is clicked, grades 604 of the clicked categories *L2 and *L3 may be set to 1.

Specifically, the grade may be set according to the existing display order and consecutively clicked categories may be set to the same grade. The grade 605 of the category L5 clicked after L3 may be set to 2.

The set grades of the clicked categories may be expressed as:

TABLE 1

|  | L1 | L2 | L3 | L4 | L5 | L6 | L7 |
|---|---|---|---|---|---|---|---|
| Grade |  | 1 | 1 |  | 2 |  |  |

As described above, when the grade setting about the clicked categories is completed, it is possible to compute the grade of the reserved category of which a click is reserved by the user. The grade of the reserved category may be computed according to Equation 1 above. Equation 1 may denote the mean of an arithmetic sequence when the number of reserved categories is the arithmetic sequence with the common difference of 1.

Specifically, when there are m clicked categories with respect to the grade with the common difference of 1, the reserved grade may be set to a grade from m+1. When it is impossible to make an individual evaluation on the reserved category, it is possible to compute the grade of the reserved category using the mean of the arithmetic sequence.

According to Equation 1 above, in the above example, k=4 and n=2. Accordingly, grades 606 of L6 and L7 corresponding to the reserved category are "(2*4+2−1)/2=4.5". In association with Table 1, the grades of the categories including the grade of the reserved categories may be expressed as,

TABLE 2

|  | L1 | L2 | L3 | L4 | L5 | L6 | L7 |
|---|---|---|---|---|---|---|---|
| Grade |  | 1 | 1 |  | 2 | 4.5 | 4.5 |

Grades of L1 and L4 corresponding to the skipped category may be computed according to Equation 2 above. When the number of skipped categories is the arithmetic sequence with the common difference of 1, the grade may be computed as the same value using the mean of the arithmetic sequence, regardless of an order of the skipped category.

Specifically, according to Equation 2, in the above example, k=6 and n=2. Accordingly, the grades 607 of the skipped categories are "(2*6+2−1)/2=6.5". In association with Table 2, the grades of all the categories including the grades of the skipped categories may be expressed as,

TABLE 3

|  | L1 | L2 | L3 | L4 | L5 | L6 | L7 |
|---|---|---|---|---|---|---|---|
| Grade | 6.5 | 1 | 1 | 6.5 | 2 | 4.5 | 4.5 |

Figure 7:
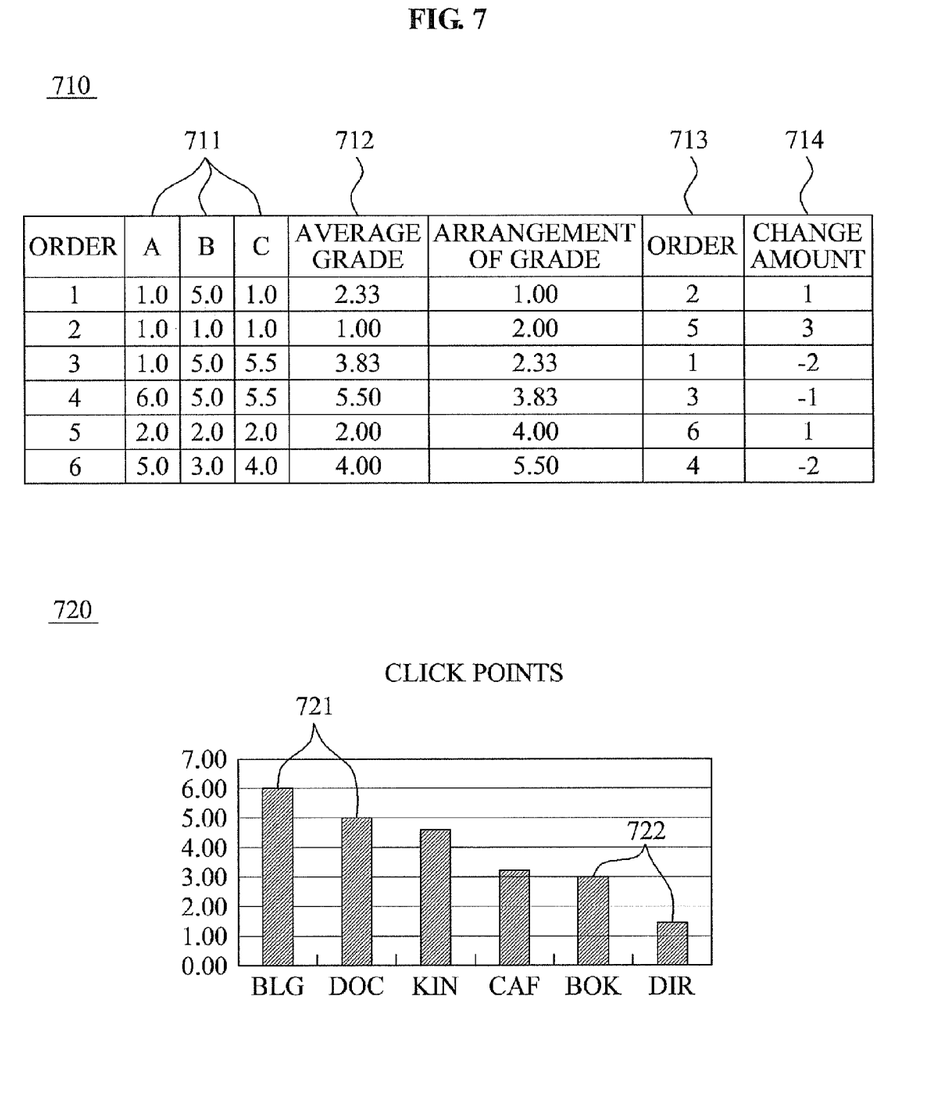
FIG. 7 illustrates an example of determining a display order of a category based on a grade according to an embodiment of the present invention.

FIG. 7 is an example of determining a display order of a category based on a grade according to an embodiment of the present invention.

In order to determine a display order of each of categories used in the example of FIG. 2, a table 710 determines a grade of each user, shown in fields 711, based on click information, instead of using the number of clicks. Tie click information includes information about whether the categories are clicked and a clicked order between the categories. Also, the table 710 shows an order that is arranged according to the average grade and a change amount in the order. The average grade is shown in a field 712, the order is shown in a field 713, and the change amount is shown in a field 714.

A graph 720 shows click points for each category. The click points may use a value that is obtained by excluding the grade of the category from (a total number of categories+1). For example, when the total of categories is "6" and the grade is "1", the click points of the category may be "6+1−1=6". Click points of a category with grade "5" may be "6+1−5=2".

Specifically, in the graph 720, the click points is computed based on the grade of the table 710 and the average of the click points is shown for each category. Referring to bars 721 and 722 shown in the graph 720, there is a difference between categories with the same number of clicks and also between unclicked categories. Specifically, it is possible to determine a display order with the user intent reflected with respect to categories with the same number of clicks and unclicked categories.

As described above, a search result providing method according to the present invention may set a grade of each of a plurality of categories, provided as a search result for a keyword, based on a number of clicks for each category and a clicked order between the plurality of categories, and provide the search result for the keyword based on the grade and thereby can provide the search result with the user intent reflected.

Also, it is possible to classify unclicked categories into a category skipped by a user and a category of which a click is reserved by the user, and set a grade of the category and thereby determine a display order with the user intent reflected between the unclicked categories. Also, it is possible to use grouping and the mean for determining a grade and thereby reduce the negative effect that may occur when using user feedback information.

Figure 8:
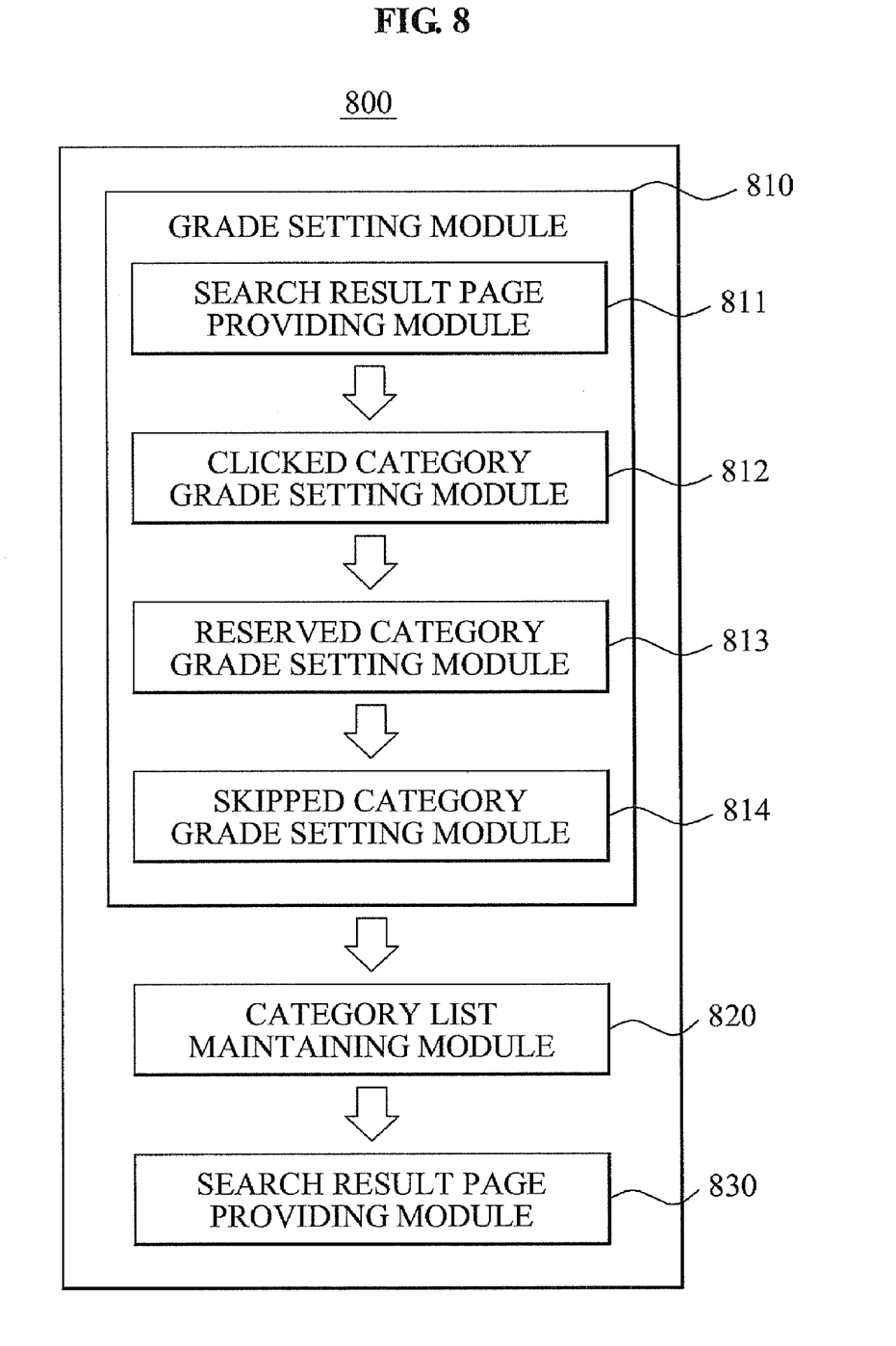
FIG. 8 is a block diagram illustrating an internal configuration of a system for providing a search result according to an embodiment of the present invention.

FIG. 8 is a block diagram illustrating an internal configuration of a system 800 for providing a search result according to an embodiment of the present invention. As shown in FIG. 8, the search result providing system 800 includes a grade setting module 810, a category list maintaining module 820, and a search result providing module 830.

The grade setting module 810 sets a grade of a category associated with a keyword based on click information. The click information may include information regarding whether the category is clicked on and a clicked order between categories. The grade may be set for a clicked category, a reserved category, and a skipped category. The grade of the clicked category may be set based on whether the category is clicked. The grade of the reserved category and the grade of the skipped category may be set based on the clicked order.

For this, as shown in FIG. 8, the grade setting module 810 may include a search result page providing module 811, a clicked category grade setting module 812, a reserved category grade setting module 813, and a skipped category grade setting module 814.

The search result page providing module 811 provides a search result page about the category as the search result for the keyword entered from a user terminal. The search result page may be constructed based on a default category list where the category is arranged according to a number of clicks on the category. The clicks occur in association with the keyword. Specifically, in order to obtain click information about categories associated with the keyword entered from the user terminal, the search result page providing module 811 may construct the search result page in the order of the default category list and provide the search result page for the user terminal. In the default category list, the categories are arranged according to the number of clicks on each category.

The clicked category grade setting module 812 sets the grade of the category based on whether the category included in the search result page is clicked on. For this, the clicked category grade setting module 812 may verify the clicked category in an order of the default category list to set the grade of the clicked category, and set consecutively clicked categories as the same grade. For example, among clicked categories, a highest order category in the default category list, that is, a first category may be set to grade "1" and a next highest order category, that is, a second category may be set to grade "2". However, when the first category and the second category are consecutively clicked, the second category may be set to grade "1" the same as the first category.

The reserved category grade setting module 813 sets a grade of one or more reserved categories that are positioned below the lowest positioned category in the search result page among the clicked categories. The reserved category grade setting module 813 may include a reserved category number verifying module (not shown) configured to verify the reserved category and a number of reserved categories based on the lowest positioned category in the search result page among the clicked categories, and a reserved category grade computing module (not shown) configured to compute a grade of the reserved category based on the number of clicked categories and the number of reserved categories.

In order to compute the grade of the reserved category, the reserved category grade computing module may compute the grade of the reserved category according to, $$\text{grade of reserved category} = (2k+n-1)/2 \quad \text{[Equation 3]}$$

where k denotes (the number of clicked categories+1), n denotes the number of reserved categories, and Equation 3 denotes the mean of an arithmetic sequence when the number of reserved categories is the arithmetic sequence with a common difference of 1. Specifically, when there are m clicked categories with respect to the grade with the common difference of 1, the reserved grade may be set to a grade from m+1. When it is impossible to make an individual evaluation on the reserved category, it is possible to compute the grade of the reserved category using the mean of the arithmetic sequence.

The skipped category grade setting module 814 sets a grade of a skipped category that is a remaining category after excluding the clicked category and the reserved category. For this, the skipped category grade setting module 814 may include a skipped category number identifying module (not shown) configured to identify a number of skipped categories from a total of categories, wherein the skipped category is a remaining category after excluding the number of clicked categories and the number of reserved categories; and a skipped category grade computing module (not shown) configured to compute the grade of the skipped category based on the number of clicked categories, the number of reserved categories, and the number of skipped categories.

In order to compute the grade of the skipped category, the skipped category grade computing module may compute the grade of the skipped category according to, $$\text{grade of skipped category} = (2k+n-1)/2 \quad \text{[Equation 4]}$$

where k denotes (the number of clicked categories+the number of reserved categories+1), n denotes the number of skipped categories, and Equation 4 denotes the mean of an arithmetic sequence when the number of skipped categories is the arithmetic sequence with a common difference of 1.

The category list maintaining module 820 creates a category list and maintains the category list in association with the keyword. The category list includes the category that is arranged according to the grade. The category list maintaining module 820 may create the category list by arranging the category of a default category list according to the grade and store the category list in a database in association with the keyword. The category of the default category list may be arranged according to a number of clicks on the category.

The search result providing module 830 provides a search result for the keyword in an order of the category in the category list. For this, the search result providing module 830 may retrieve a category list associated with the keyword from the database when the keyword is entered from a user terminal, construct a search result page in an order of a category that is included in the retrieved category list, and provide the search result list for the user terminal as the search result.

As described above, a search result providing system according to the present invention may set a grade of each of a plurality of categories, provided as a search result for a keyword, based on a number of clicks for each category and a clicked order between the plurality of categories, and provide the search result for the keyword based on the grade and thereby can provide the search result with the user intent reflected.

Also, it is possible to classify unclicked categories into a category skipped by a user and a category of which a click is reserved by the user, and set a grade of the category and thereby determine a display order with the user intent reflected between the unclicked categories. Also, it is possible to use grouping and the mean for determining a grade and thereby reduce the negative effect that may occur when using user feedback information.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

According to the present invention, there may be provided a method and system that can set a grade of each of a plurality of categories, provided as a search result associated with a keyword, based on a number of clicks for each category and a clicked order between the plurality of categories, and provide the search result for the keyword based on the grade and thereby can provide the search result with the user intent reflected.

Also, according to the present invention, there may be provided a method and system that can classify unclicked categories into a category skipped by a user and a category of which a click is reserved by the user, and set a grade of the category and thereby can determine a display order with the user intent reflected between the unclicked categories.

Also, according to the present invention, there may be provided a method and system that can use grouping and the mean for determining a grade and thereby reduce the negative effect that may occur when using user feedback information.

As described above, the present invention has been described with reference to a few embodiments and accompanying drawings, which are only provided to help the easy description of the invention and thus the present invention is not limited thereto. Accordingly, it will be apparent to those of skills in the art that various modifications and changes may be made from the description. Specifically, even when using the click points instead of the above-described grade, the same effect may be obtained and a grade setting scheme may be variously modified. For example, it is possible to set the grade of the reserved category using (a subsequent grade of the grade of the lowest positioned category in the search result page among the clicked categories+α), instead of using the mean of the arithmetic sequence of the grade of the reserved category.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A computer-implemented method of providing a search result, the method comprising:
   determining grades of categories associated with a search keyword based on click information, said click information comprising at least one piece of historical click through data indicating which categories were clicked on in one or more previous searches and an order of clicks among clicked categories;
   creating and maintaining a category list in association with said search keyword, said category list comprising at least one of the categories ordered according to said grades; and
   upon receipt of a search request comprising said search keyword, providing search results categorized under the at least one of the categories of said category list,
   wherein the determining grades and providing search results are performed by a processor, and
   wherein the determining grades comprises determining grades of two or more categories with the same number of clicks using the order of clicks among clicked categories.

2. The method of claim 1, wherein the determining grades of categories further comprises:
   verifying whether each of said categories has been clicked on, and determining grades of said clicked categories
   determining a grade of one or more reserved categories that are positioned below a lowest positioned category in the search result page among said clicked categories; and
   determining grades of one or more skipped categories that are unclicked categories positioned higher than the lowest positioned category among said clicked categories on the search result page.

3. The method of claim 2, wherein said search result page is constructed based on a default category list in which the categories are arranged according to a number of clicks on each category in one or more previous searches in association with said search keyword, and consecutively clicked categories which are positioned adjacent each other are set as a same grade.

4. The method of claim 2, wherein the determining grades of one or more reserved categories comprises
   computing the grade of said one or more reserved categories by an arithmetic operation of the number of the clicked categories and the number of the reserved categories.

5. The method of claim 4, wherein the grade of said one or more reserved categories is computed according to the following equation:

$$\text{the grade of the reserved category} = (2k+n-1)/2,$$

where k denotes (the number of clicked categories+1), n denotes the number of reserved categories, and Equation 5 denotes a mean of an arithmetic sequence when the number of reserved categories is an arithmetic sequence with a common difference of 1.

6. The method of claim 2, wherein the determining grades of one or more skipped categories comprises:
   identifying a number of skipped categories from a total number of categories, wherein the skipped category is an unclicked category positioned higher than said lowest positioned category among said clicked categories on the search result page; and
   computing the grade of the skipped category based on the number of clicked categories, the number of reserved categories, and the number of skipped categories.

7. The method of claim 6, wherein the grade of said skipped category is computed according to the following equation:

$$\text{the grade of the skipped category} = (2k+n-1)/2,$$

where k denotes (the number of clicked categories+the number of reserved categories+1), n denotes the number of skipped categories, and Equation 6 denotes a mean of an arithmetic sequence when the number of skipped categories is an arithmetic sequence with a common difference of 1.

8. The method of claim 1, wherein the creating and maintaining a category list in association with said search keyword comprises creating the category list by rearranging the categories of a default category list according to the grades and storing the category list in a database in association with said search keyword, wherein the category of the default category list is arranged according to a number of clicks on each said category.

9. The method of claim 1, wherein the providing comprises:
retrieving a category list associated with the search keyword from the database in response to the keyword being received from a terminal;
constructing a search result page in an order of the categories that are included in the retrieved category list; and
providing the search result page to the terminal.

10. One or more storage media having stored thereon a computer program that, when executed by one or more processors, causes the one or more processors to perform acts comprising:
determining grades of categories associated with a search keyword based on click information, said click information comprising at least one piece of historical click through data indicating which categories were clicked on in one or more previous searches and an order of clicks among clicked categories;
creating and maintaining a category list in association with said search keyword, said category list comprising at least one of the categories ordered according to said grades; and
upon receipt of a search request comprising said search keyword, providing search results categorized under the at least one of the categories of said category list, and
wherein the determining grades comprises determining grades of two or more categories with the same number of clicks using the order of clicks among clicked categories.

11. A system for providing search results, comprising:
a grade setting module configured to determine grades of categories associated with a search keyword based on click information, said click information comprising at least one piece of historical click through data indicating which categories were clicked on in one or more previous searches and an order of clicks among clicked categories;
a category list maintaining module configured to create and maintain a category list in association with said search keyword, said category list comprising at least one of the categories ordered according to said grades;
a memory to store said category list;
one or more processors configured to process data; and
a search result providing module configured to provide search results categorized under the at least one of the categories of said category list,
wherein the grade setting module is configured to determine grades of two or more categories with the same number of clicks using the order of clicks among clicked categories.

12. The system of claim 11, wherein the grade setting module comprises:
a clicked category grade setting module configured to determine grades of clicked categories based on whether the categories included in the search result page are clicked on and the order of clicks a reserved category grade setting module configured to determine a grade of one or more reserved categories that are positioned below a lowest positioned category in the search result page among said clicked categories; and
a skipped category grade setting module configured to determine grades of one or more skipped categories that are unclicked categories positioned higher than the lowest positioned category among said clicked categories on the search result page.

13. The system of claim 12, wherein said search result page is constructed based on a default category list in which categories are arranged according to a number of clicks on each category in one or more previous searches in association with said search keyword, and consecutively clicked categories which are positioned adjacent each other being set as a same grade.

14. The system of claim 12, wherein the reserved category grade setting module comprises:
a reserved category number verifying module configured to verify the reserved categories and a number of the reserved categories based on the lowest positioned category among the clicked categories on the search result page; and
a reserved category grade computing module configured to compute the grade of the reserved category by an arithmetic operation of the number of the clicked categories and the number of the reserved categories.

15. The system of claim 14, wherein the reserved category grade computing module is configured to compute the grade of the reserved category according to the following equation:

$$\text{the grade of the reserved category} = (2k+n-1)/2,$$

where k denotes (the number of clicked categories+1), n denotes the number of reserved categories, and Equation 7 denotes a mean of an arithmetic sequence when the number of reserved categories is an arithmetic sequence with a common difference of 1.

16. The system of claim 12, wherein the skipped category grade setting module comprises:
a skipped category number identifying module configured to identify a number of skipped categories, which is a number of remaining categories after excluding the clicked categories and the reserved categories from total categories; and
a skipped category grade computing module configured to compute the grade of the skipped category based on the number of the clicked categories, the number of the reserved categories, and the number of the skipped categories.

17. The system of claim 16, wherein the skipped category grade computing module computes a grade of a skipped category according to the following equation:

$$\text{the grade of the skipped category} = (2k+n-1)/2,$$

where k denotes (the number of clicked categories+the number of reserved categories+1), n denotes the number of skipped categories, and Equation 8 denotes a mean of an arithmetic sequence when the number of skipped categories is an arithmetic sequence with a common difference of 1.

18. The system of claim 11, wherein the category list maintaining module is configured to create the category list by rearranging the categories of a default category list according to the grade and to store the category list in a database in association with said search keyword, wherein the category of the default category list is arranged according to a number of clicks on each said category.

19. The system of claim 11, wherein the search result providing module is configured to retrieve a category list associated with the search keyword from the database in response to the keyword being received from a user terminal, to construct a search result page in an order of the categories that are included in the retrieved category list, and to provide the search result page to the user terminal.

* * * * *